US012659674B2

(12) United States Patent
Candelore et al.

(10) Patent No.: US 12,659,674 B2
(45) Date of Patent: Jun. 16, 2026

(54) MULTI-DIRECTIONAL HEARING AID ADJUSTMENT USING IMAGE CAPTURE

(71) Applicant: Sony Group Corporation, Tokyo (JP)

(72) Inventors: Brant L. Candelore, Poway, CA (US); James R. Milne, Ramona, CA (US); Justin Kenefick, San Diego, CA (US); William Clay, San Diego, CA (US)

(73) Assignee: SONY GROUP CORPORATION, Tokyo (JP)

(*) Notice: Subject to any disclaimer, the term of this patent is extended or adjusted under 35 U.S.C. 154(b) by 157 days.

(21) Appl. No.: 18/528,396

(22) Filed: Dec. 4, 2023

(65) Prior Publication Data

US 2025/0184673 A1 Jun. 5, 2025

(51) Int. Cl.
*H04R 25/00* (2006.01)
*H04S 7/00* (2006.01)

(52) U.S. Cl.
CPC ............... *H04R 25/43* (2013.01); *H04S 7/40* (2013.01); *H04R 2225/41* (2013.01); *H04R 2460/07* (2013.01); *H04S 2420/01* (2013.01)

(58) Field of Classification Search
CPC .... H04R 25/43; H04R 25/407; H04R 25/552; H04R 2225/41; H04R 2460/07; H04S 2420/01; H04S 7/40
See application file for complete search history.

(56) References Cited

U.S. PATENT DOCUMENTS

2016/0080874 A1 3/2016 Fullam
2016/0183014 A1* 6/2016 Guo ........................ G10L 15/25 381/313
2019/0028817 A1 1/2019 Gabai
2019/0174237 A1 6/2019 Lunner
2021/0225391 A1 7/2021 Wexler
2021/0274292 A1* 9/2021 Solum .................. H04R 25/505
2023/0164508 A1 5/2023 Shin

OTHER PUBLICATIONS https://www.apple.com/in/newsroom/2023/06/introducing-apple-vision-pro/—Introducing Apple Vision Pro: Apple's first spatial computer—Press Release Jun. 5, 2023.

* cited by examiner

*Primary Examiner* — Matthew A Eason
(74) *Attorney, Agent, or Firm* — Trellis IP Law Group, PC

(57) ABSTRACT

A hearing aid focusing system is provided to enables a user to hear an environmental sound. The focusing system adaptively adjusts a hearing aid in response to visual information about a user environment from one or more image capture devices. The focusing system analyzes images captured of the environment to identify one or more sources of sound that warrants user attention. Once a sound source is pinpointed and determined to be significant for the user, microphones of the hearing aid are automatically adjusted as needed in vertical and/or horizontal directions toward the sound source.

17 Claims, 6 Drawing Sheets

200

MULTI-DIRECTIONAL HEARING AID ADJUSTMENT USING IMAGE CAPTURE

BACKGROUND

Hearing aids are equipped with microphones to receive sound and convert the sound to digital signals. Some hearing aids are configured to manage background noise for a user to hear certain sounds. Directional microphone capabilities can assist in focusing onto a particular sound. For example, an adaptive directional microphone may pick up sound from a single direction, such as directly in front of a user, or may focus along a horizontal plane (e.g., left and right). Competing surrounding sounds may be minimized by adjusting noise filters and microphone amplification.

Typically, a person can use vision to work together with hearing to provide valuable information about an environment. At times, a source of sound may visually alert a person that attention is needed to listen to the sound. At other times a person hearing a sound will look to visually find the source of the sound. However, when a person, such as a hearing impaired person, is not able to discern a particular sound, the person may not know to look to find the source of the sound. In such cases, the complementary relationship between vision and hearing may be challenged. A hearing aid that blends hearing assistance with visual information can be of great assistance.

SUMMARY

The present hearing aid focusing system (also called "focusing system" or "system") enables adaptive adjustments to a hearing aid in response to visual information about a user environment from one or more image capture devices. The focusing system analyzes images (e.g., video, photographs, etc.) captured of the environment to identify a at least one source of sound that warrants user attention. Once the sound source(s) is/are pinpointed and determined to be significant for the user, microphones that are vertically and horizontally offset on the hearing aid are adjusted as needed in vertical and/or horizontal focus directions toward the sound source.

A method is provided for adjusting a hearing aid of a user in which a hearing aid is provided. The hearing aid includes at least a first microphone in a position that is vertically offset and horizontal offset from a second microphone of the hearing aid. One or more images of an environment of the user are captured by one or more image capture devices commutatively coupled to the hearing aid and received by the hearing aid. The one or more images are analyzed by the focusing system to identify at least one target sound source (also referred to as "target source" herein) based, at least in part, on one or more visual indicators depicted in the environment. Once the at least one target sound source is identified and direction of the source determined, the focus of at least one of the sound received by the first and second microphones are adjusted in at least one of a vertical direction and a horizontal direction toward the at least one target sound source.

In some aspects of the method, grid location information is determined for the target sound source based, at least in part, on a position of the target sound source in one or more grid cells of the one or more images. Using the grid location information, to focus the sound from first microphone and second microphone is adjusted.

Where multiple potential sound sources are detected that include the target sound source and other potential sound sources, it may be determined that each individually satisfy at least one visual indicator of the one or more visual indicators. In this case, the target sound source may be selected over the other potential sound sources based on the at least one visual indicator satisfied by the target sound source. The target sound source and at least one of the other multiple potential sound sources may be found to satisfy a same one or more of the at least one visual indicator. In such cases, a tie breaker visual indicator may be applied to identify the target sound source.

In some implementations, a target sound source may be identified and locked into by the focusing system. Where it is determined that the target sound source is in a changed location relative to the hearing aid positioned on the user, the focus of sound received by the at least one of the first microphone and the second microphone may be re-adjusted in at least one of the vertical direction and the horizontal direction toward the changed location of the target sound source.

In still some implementations, various visual indicators used to identify a target sound source from the image(s) may include information regarding a distance of the target sound source from the user. Analyzing the one or more images includes estimating the distance of the target sound source to be within a threshold distance from the user. The visual indicators may also include identifying characteristics of a person of importance and analyzing the one or more images includes identifying the person of importance as the target sound source.

In still some implementations, the hearing aid may communicate with a second hearing aid of a pair being used by the user. The location of the target sound source may be transmitted to the second hearing to sync focus of the second hearing aid onto the target sound source.

In some implementations, an apparatus of a hearing aid focusing system is provided, which is configured for focusing onto a target sound source by a hearing aid in conjunction with an image capture device. The hearing aid has at least a first microphone in a position that is vertically offset and horizontal offset from a second microphone of the hearing aid. the apparatus includes one or more processors and logic encoded in one or more non-transitory media for execution by the one or more processors and when executed operable to perform various operations as described above in terms of the method. The operations include receiving one or more images of an environment of the user, captured by the one or more image capture devices in a fixed position in relationship to the hearing aid, and commutatively coupled to the hearing aid. The one or more images are analyzed to identify a target sound source based, at least in part, on one or more visual indicators depicted in the environment. Focus of sound received by at least one of the first microphone and the second microphone is adjusted in at least one of a vertical direction and a horizontal direction toward the target sound source. The apparatus may further perform operations of the focusing method described above.

In some implementations, a non-transitory computer-readable storage medium is provided which carries program instructions for adjusting a hearing aid worn by a user. These instructions when executed by one or more processors cause the one or more processors to perform operations as described above for the focusing method described above.

A further understanding of the nature and the advantages of particular embodiments disclosed herein may be realized by reference of the remaining portions of the specification and the attached drawings.

BRIEF DESCRIPTION OF THE DRAWINGS

The disclosure is illustrated by way of example, and not by way of limitation in the figures in which like reference numerals are used to refer to similar elements.

DETAILED DESCRIPTION OF EMBODIMENTS

Figure 1:
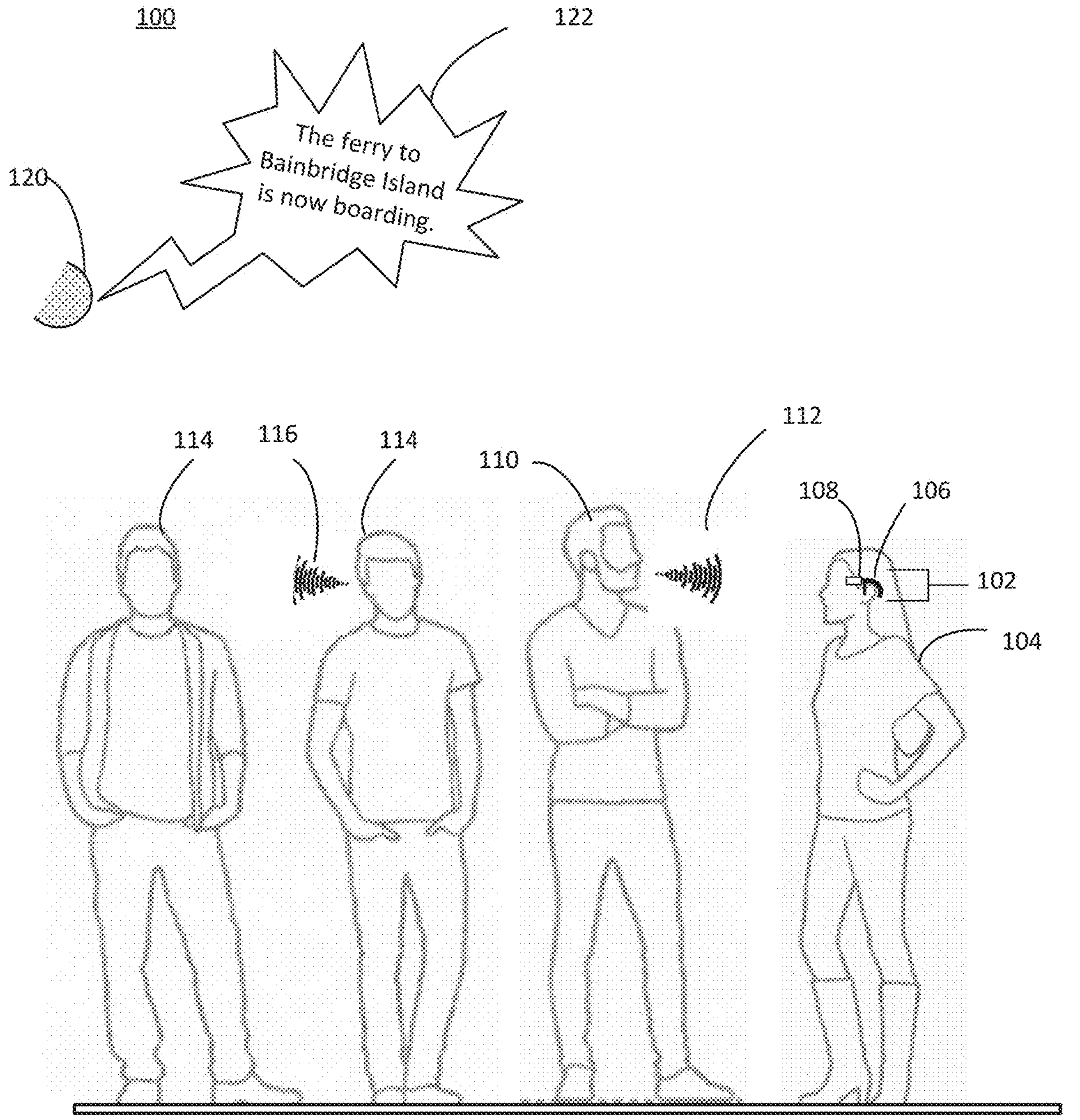
FIG. 1 is a conceptual diagram illustrating an example setting in which various aspects of the hearing aid focusing system can be implemented, in accordance with some implementations.

The present hearing aid focusing system enables a user to adjust microphones in multiple directions in response to pinpointing a sound source by visual assessment of the environment. One or more image capture devices that are communicatively coupled to the hearing aid, supply images that can include video content, of the setting around the user. By analyzing the images and applying various visual indicators to objects depicted in the images, a sound source is identified. At least two microphones of the hearing aid are offset in both vertical and horizontal planes relative to each other and can enable vertical and horizontal adjustments toward an identified sound source.

The hearing aid of the focusing system can include a variety of types of hearing assisted devices to support a user in hearing environmental sounds. The hearing aid may be worn by the user or implanted in/on the user. Hearing aids can capture, process, and amplify sounds that pass to the ear canal of the user. Processing circuitry in the hearing aid may improve the quality of the sound, for example, by filtering out undesired noises from the sounds received by the hearing aid. The hearing aid may be a member of hearables, The present focusing system may be employed for other forms of hearables as well, such as earbuds, smart headphones, and other ear-worn wearable device.

Although hearing aids are described, it should be understood that the hearing aid focusing system may also be applied to other hearing devices, also referred to as "hearables", that include adjustable focusing capabilities as described below with regards to FIG. 2.

Signals and data representing detectable aspects of the environment of the user are collected by microphone(s) and image capture device(s), such as a camera, of the hearing aid focusing system to assess various external noises and visual clues to detect a sounds source necessitating the user listening attention. In some instances, a target sound source may be identified by its association with characteristic(s) of the user and/or environmental.

The "user" of the hearing aid focusing system as applied in this description, refers to a person who uses the focusing system for the purpose of assisted hearing. Without the use of the focusing system, a hearing impaired individual may depend on the user's sight to fix onto a source of a sound. However, some sources of important sounds may not be easily seen by the person. For example an object may be outside of the field of vision of the person. In some circumstances in which the person is capable of seeing the sound source, it may not be readily apparent to the user that the sound is important, especially if the sound is not clearly discernable. The present system employs an image capture device that works together with hearing aid to provide visual information of a sound source and enable the user to pay attention to the sound.

Some other types of hearing systems that do not include the presently described focusing system, may rely on a person seeing and responding to a sound source, such as by tracking the gaze or other facial expression of a user looking at an object that is a source of sound. Such other systems that require the user to draw attention to a sound source in order to focus a hearing device are fraught with limitations. The user may mistakenly look at a wrong object as a source of sound. Furthermore, the user may not be able to see the source of a sound, such as visual impaired individuals or a sound source that is not in the current field of vision of the user. By contrast, the present focusing system enables adjustments to be made in response to sound sources that need not be detected in the vision of the user and instead uses the image capture device to spot and identify a sound source. Thus, the focusing system may enable a user to hear an important sound even before the user can see the source of the sound. The image capture device(s) use the capture environmental images.

A sound source may be a single object in an environment of a user, such as a person talking or a loud speaker. The sound source may also be a collection of objects that produce a collective (same) sound, such as a choir singing a song or surround sound speakers. In some implementations, the collection of objects may produce a complementary sound in which various sounds from each source should be heard to fully understand the sounds in context, such as multiple speakers where one speaker plays one part and another speaker plays another part. Not all sound sources are located directly straight in front of the user along a plane parallel with the hearing device. Often a sounds source is located at various angles relative to microphones of the hearing aid. For example, an object that makes sound may be vertically lower than the hearing aid, such as a child, a person sitting, or object on the ground. A vertically higher sound source such as an elevated loud speaker may also be identified.

Signal processing of the multiple microphones may be adjusted to provide greater focus onto the sound source, whether directed vertically lower or higher, or along various horizontal directions. Using beamforming techniques, signals from the microphones may be analyzed and complex math used to align to a particular direction of the target sound source in which particular sounds may be amplified. For example, time signals maybe analyzed at multiple positions and with slight time differences doe to measuring at different positions and the non-instantaneous speed of sound. Signals measured at each microphone can be combined in a way to amplify certain parts of the signal based on that time delay in combination with actual content of the signals and known positions of the microphones. The result is that target sound from the location of the target sound source is amplified. Thus, microphones that are vertically and horizontally offset from each other may be utilized for vertically and horizontally angled focus onto a sound source location.

The present hearing aid focusing system addresses these problems with other systems and have additional benefits.

FIG. 1 is an illustrative example of an environment 100 in which the hearing aid focusing system 102 may be used to assist the user 104 to focus onto important sounds in the environment 100. The focusing system 102 includes a hearing aid 106 and an image capture device 108. The image capture device 108 may be integrated with, coupled to, or otherwise in electrical communication with the hearing aid 106 including two or more microphones (not shown).

In the example of FIG. 1, an associate person 110 speaks to the user 104. At one point in time, the speech sound 112 of the associate 110 may be identified as a target sound source for the hearing aid focusing system 102. The image capture device 108 captures image(s) of the associate 110 and the images (and in some cases sound associate with video images) are analyzed using visual indicators. In this case, the visual indicators may include a person talking (with lips moving) while facing the user. Another visual indicator may be the general distance of the associate110 to the user being within a threshold distance. The threshold distance may be predefined for the type of sound, such as a generally acceptable distance for a person to converse with another person, such as within 5 feet. The threshold distance may be a predefined distance and may also take into account other environmental factors such as the setting of the conversation, in this case a ferry terminal. The images captured of the associate 110 are analyzed to estimate the distance of the associate 110 from the user.

An additional visual indicator may include identification of the associate 110 as a person predefined as significant to the user, such as a friend, coworker, for family member. The hearing aid focusing system 102 may utilize algorithms for image recognition or people and objects, such as facial recognition, object recognition, etc. The focusing system may use stored visual characteristics of a person to match with a person detected in the images and identify that person as significant to the user. In some implementations, image recognition may be performed by the hearing aid system. In other implementations, at least some of the steps of image recognition may be offloaded to external computing resources, such as by the images sent via BLUETOOTH to the smartphone of the user and the smartphone performs the image analysis and/or further communicates with other computing devices, such as a server accessible over network to assist in the image recognition.

The image capture device 108 capture images of a speaker 120. The focusing system may prioritize the speaker when an announcement is detected by the microphones. The focusing system may discern announcement type sounds. For example, the speaker announcing, "The ferry to Bainbridge Island is now boarding" 122 may be focused on over the associate 110 speaking 112. For example, the visible indicators may include detection of a mounted speaker as well as the setting of a ferry terminal. In this manner, different target sound sources may be identified at different times in the same environment.

In some cases, a sound source object may not be visible but instead a sound source is identified by a location of a known sound source being detected by image recognition analysis of the images. For example, a speaker may be obscured from view of the image capture device. However, through image recognition of the environment, a place of the user may be identified, such as a ferry terminal. Further, the system may access a database of important places and match the environment as an important place. Such places may also be associated with fixed sound sources, such as a speaker, secured in a known location in the environment. For example, the place may be identified as a particular movie theater establishment (identified by address of the location), and further identify the theater (e.g., theater 3). A stored location for the speakers may be accessed, such as left and right of the screen or behind the screen. The stored location of the speakers may be used as the target sound source(s). Another example can include identifying the environment as a particular automobile by the visual indicators for the car. The source location databased may be accessed to determine where the car speaker(s) are located, such as in-dash or in-door speakers.

In other implementations, visual indicators may include identifying an object that typically is associated with an important sound and a stored location of the sound source location may be used to identify the position of the sound source. For example, a particular model of television may use a glass display as a speaker. The identification of the television may lead to identifying where the sound speaker is located for the television. identifying the location or item right give hints as to where the speakers.

By default of identifying the place, the focusing system may target the previously stored location of a fixed sound source to focus onto the known location. As such, the images need not include a depiction of the sound source but should depict identifying aspects of the environment to identify the important place and known sound source location.

The hearing aid focusing system identifies the announcement as attention noise that requires the attention of the listener based on attention features of the speech and the environment. For example, the loudness level of the announcement is compared to the volume of individual noises in the environment, including the conversation 126 of bystander persons 114. The loudness level of the announcement is found to be a threshold volume level above the loudness levels of the environmental noises, sufficient to identify a target sound source.

Other bystander persons 114 in the environment who may be talking 116 in the environment 100 do not satisfy the visual indicators. These bystander persons 114 are not identified as sound sources of interest to the user and the focusing system does not focus onto the talk of these bystander persons 114. Focusing of the microphone 112 enables less important sounds to be filtered out and ignored by the user such as softer conversational talk 126 of two bystander persons 114.

Figure 2:
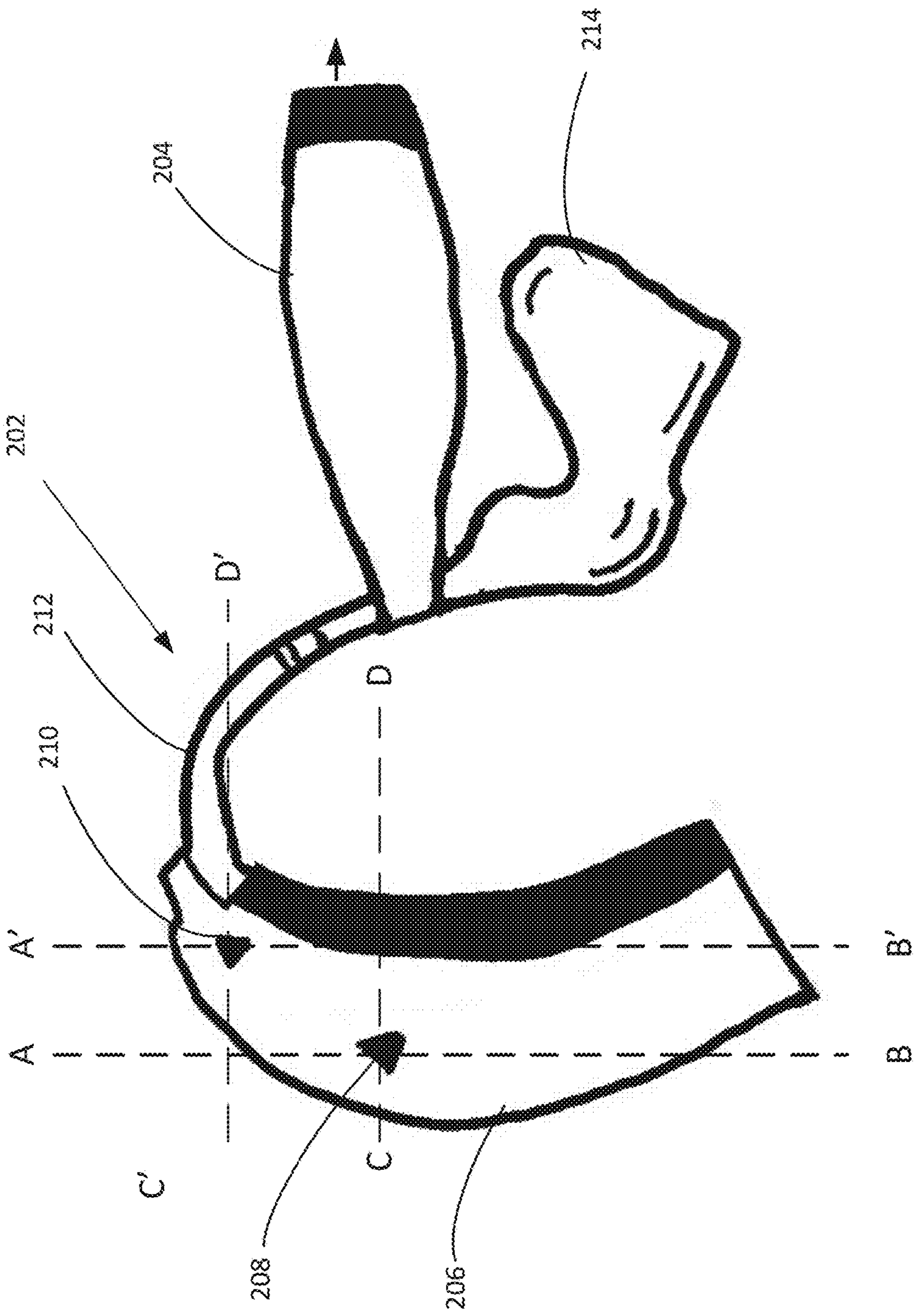
FIG. 2 is a schematic diagram of an example hearing aid including offset positioned microphones and an image capture device, in accordance with some implementations.

FIG. 2 is an example of the hearing aid focusing system 200 that includes the hearing aid 202 and an image capture device 204 communicatively coupled to the hearing aid 202 to transfer image information to the base 206 of the hearing aid 202 for analysis.

Microphones 208, 210 are positioned on the base 206 in vertical and horizontal offset locations relative to each other. Microphone 208 may be positioned on base 206 along a vertical plane AB and horizontal plane CD, as shown by dotted lines. Microphone 210 may be positioned on base 206 along vertical plane A'B' and horizontal plane C'D', as shown by dotted lines. Additional microphones may be used in the hearing aid 202. The vertical and horizontal position s of the microphones are used in conjunction with a position of the target sound source to determine a direction of focus for each microphone.

The image capture device 204 may be detachably coupled to the hearing aid, for example at an attachment piece proximal to earmold 214 (or "ear dome"). The earmold 214 includes a receiver to convert electrical signals from sound picked up by the microphone into audible sound for the user to hear. The image capture device 204 may also be placed on tube 212 that leads to base 206 of the hearing aid, or other parts of the hearing aid 202.

In some implementations, the image capture device may be an integral part of the hearing aid 202 such that the image capture device 204 and hearing aid are a single device 202. In still some implementations, the image capture device 204 may be physically separated from the hearing aid 202 but in communication with the hearing aid 202. For example, the image capture device may be a wearable device, a component of a wearable device, or attachment to a wearable, such as smart glasses. Images may include still photographs, burst shots, video, and other captured image information.

When in use, the image capture device 204 is in a fixed position relative to the hearing aid for the hearing aid to determine from the captured image information a location and/or direction of the sound source in the environment relative to the microphones 208, 210. In some implementations, the image capture device may employ a wide angle lens to capture more of the environment, such as about 60-85 degrees. Typically, the image capture device is forward facing. But one or more additional backward facing and/or side facing image capture devices may also be employed. In some implementations, image capture devices may be configured to capture 180 degrees of the environment in front of the user.

Other configurations of the hearing aid focusing system 200 may be employed and are considered within the scope of this disclosure. For example, various designs and configurations of a hearing aid may be used in which at least two microphones are vertically and horizontally offset and which communicates with the image capture device.

Figure 3:
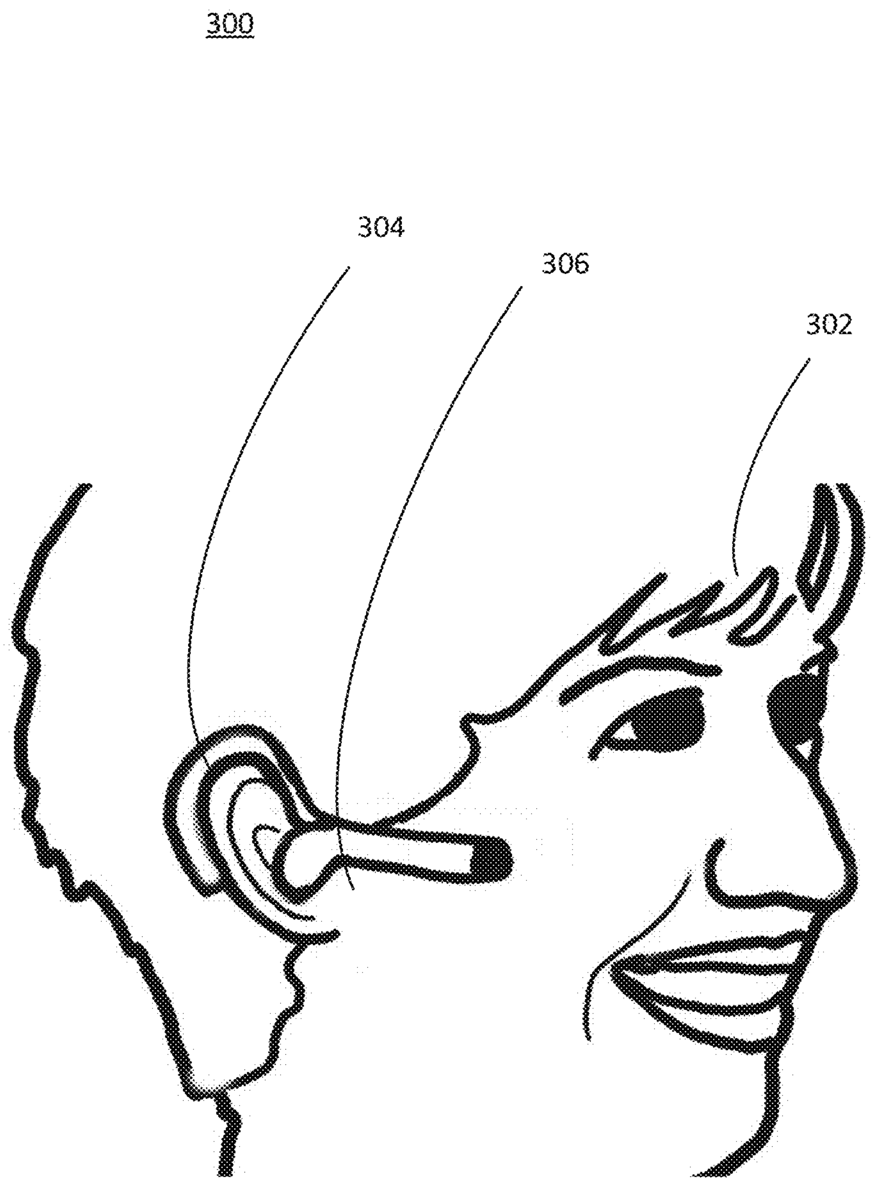
FIG. 3 is a schematic diagram of an example hearing aid with an image capture device worn by a user, in accordance with some implementations.

FIG. 3 shows an illustration of a user 302 wearing the hearing aid focusing system 300. In this example, the image capture device 306 may be extend on the hearing aid 304 to at least substantially vertically aligned with an eye of the user 302 in a placement lower than the eye. The image capture device may include glasses, a camera that is wearable anywhere on the user body, and especially the torso, e.g., a lapel pin, a camera mounted with a hat, such as positioned above the eye's line of sight, and other image capture devices in a fixed position relative to the hearing aid microphones. Other configurations are possible, such as other positions of the image capture device 306, other styles of image capture device 306 and hearing aid 304, other ways of wearing the focusing system, etc.

Figure 4:
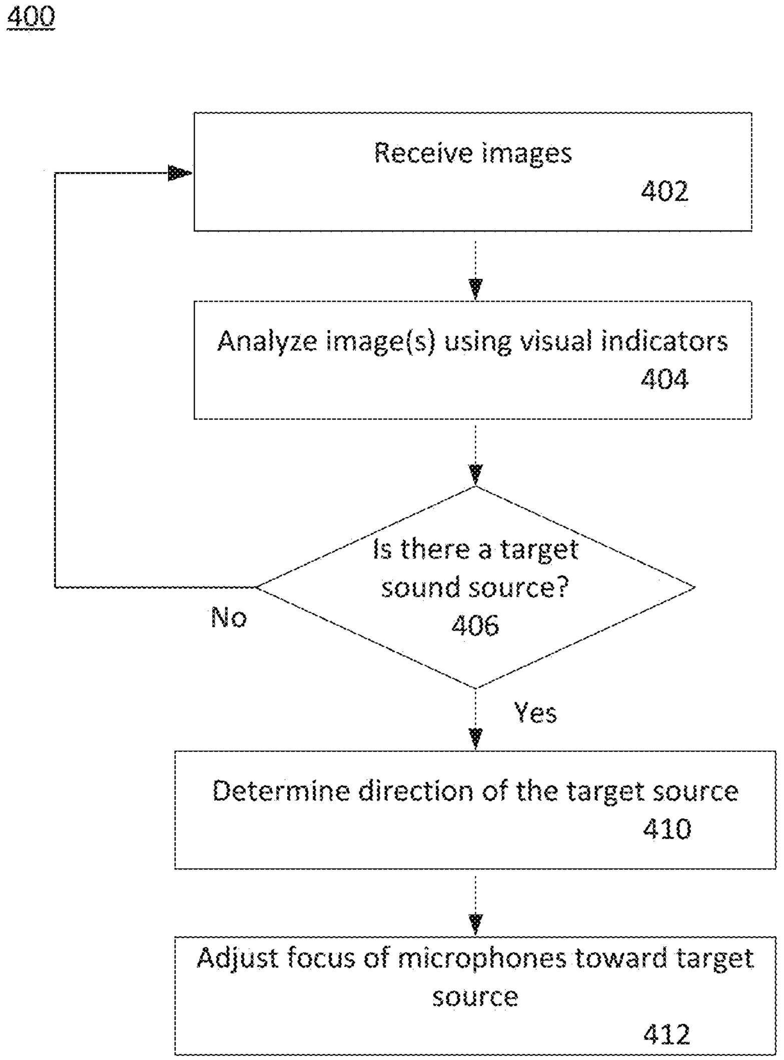
FIG. 4 is a flow diagram of an example method for adjusting focus of a hearing aid onto an identified target sound source, in accordance with some implementations.

FIG. 4 shows a flow chart of a hearing aid adjustment process 400 for the hearing aid focusing system 200 shown in FIG. 2. The process 400 is performed by a hearing aid, such as item 202 in FIG. 2 that includes multiple microphones. At least a first microphone in a position that is vertically offset and horizontal offset from a second microphone of the hearing aid.

In block 402, one or more images are received of the environment of the user. The image information is received from the one or more image capture devices 202 of FIG. 2 via an electronic communication path coupling the image capture device with the hearing aid.

In block 404, at least one of the images is analyzed to determine if a target sound source is present in the environment. One or more visual indicators are employed in the analysis of the depiction to detect an object as significant to focus. As some examples, the visual indicator may include identification of the object, movement of the object, such as lips moving, facing the user, and/or making a gesture toward the user.

In decision block 406, it is determined whether a target sound source is detected as satisfying particular visual indicators. If no target source is found in the environment captured by the present image(s), the process returns to block 402 to continue receiving images. If a target sound source is detected, the process continues to focus the hearing aid.

In some implementations, multiple objects may satisfy certain visual indicators. Unless the objects produce a same sound, the process may include prioritizing certain sound sources over the other objects that satisfy visual indicators. For example, an object that satisfies the highest number of visual indicators may be prioritized as a target sound source. In some implementations, certain visual indicators may be weighted greater or less than weights assigned to other visual indicators. In still some implementations, some sound sources may satisfy a visual indicator to a greater level, such as a person closest to the user may be identified as a target sound source over other objects that are within a significant distance but farther away from the user.

In some implementations, more than one target sound source may be identified as equally important to the user to hear. For example, multiple targets may be within a similar proximity to the user, such as a group of persons all having a conversation with the user. In such cases, the group of target sound sources may be identified and the hearing aid adjusted to focus on a point and direction among the group of target sources, such as a center of the group or on a person in the group who speaks the most.

In block 410*n* a direction of the target sound source is determined. The direction may include grid location information such as quadrant information, in which a grid is overlayed onto the image to divide the image into multiple cells of the grid that correspond with vertical and horizontal locations of the environment according to the field of view of the image capture device. Each cell, e.g., quadrant, may be labeled and the target source may be determined to be positioned within one or more of the cells, e.g., quadrants. Other processes to determine direction of an object may be used, such as applying coordinates of the target source.

The focusing system may correct for the fixed location of the image capture device on the user relative to each of the hearing aid microphones in order to determine the direction of the target source within the image(s). For example, the image capture device may be in a position 1 inch higher than a microphone and 0.25 inch left or right of the microphone. The difference in vertical and horizontal position of the microphone compared to the image capture device may be used to pre-calibrate the focusing system. The determination of direction of the target source uses this pre-calibration in analyzing the images.

In another example, a distance and position between one hearing aid and a second hearing aid worn by the user may be used to pre-calibrate the system so that target source location/direction information may be passed from one hearing aid to the other. A second hearing aid may be able to determine a direction of the target source by compensating for the horizontal and vertical differences of the position of one hearing aid to the other hearing aid. In this manner the second hearing aid may use the target source direction information from the first hearing aid to stay in sync with the first hearing aid and focus onto the same target source.

In some implementations, once the direction of the target source is determined in relation to the microphone, the focusing system may lock onto the target sound source. As more images are captured, movement of the target sound source or the user may be tracked to determine a changed location of the target sound source relative to the hearing aid positioned on the user. The focus of sound received by the microphones may be re-adjusted with the change in direction of the target sound source in at least one of the vertical direction and the horizontal direction toward the changed location of the target sound source. For example, if the user sits down or tilts its head, any resulting new direction of the target sound source may be determined and the focus readjusted.

In block 412, the focus of at least one of the first microphone and the second microphone are adjusted in at least one of a vertical direction and a horizontal direction toward the target sound source. Adjustments may include applying filters to only or primarily pass sound from the determined direction of the target source, adjusting an amplifier to enhance the target sound above other environmental sounds, etc. As a result, the user is assisted in hearing the target source sound. In some implementations, the microphone may be physically rotated toward the target source.

In some implementations, additional sound processing, e.g., for improving clarity of sound, may be used based on the recognition of the sound source.

Figure 5:
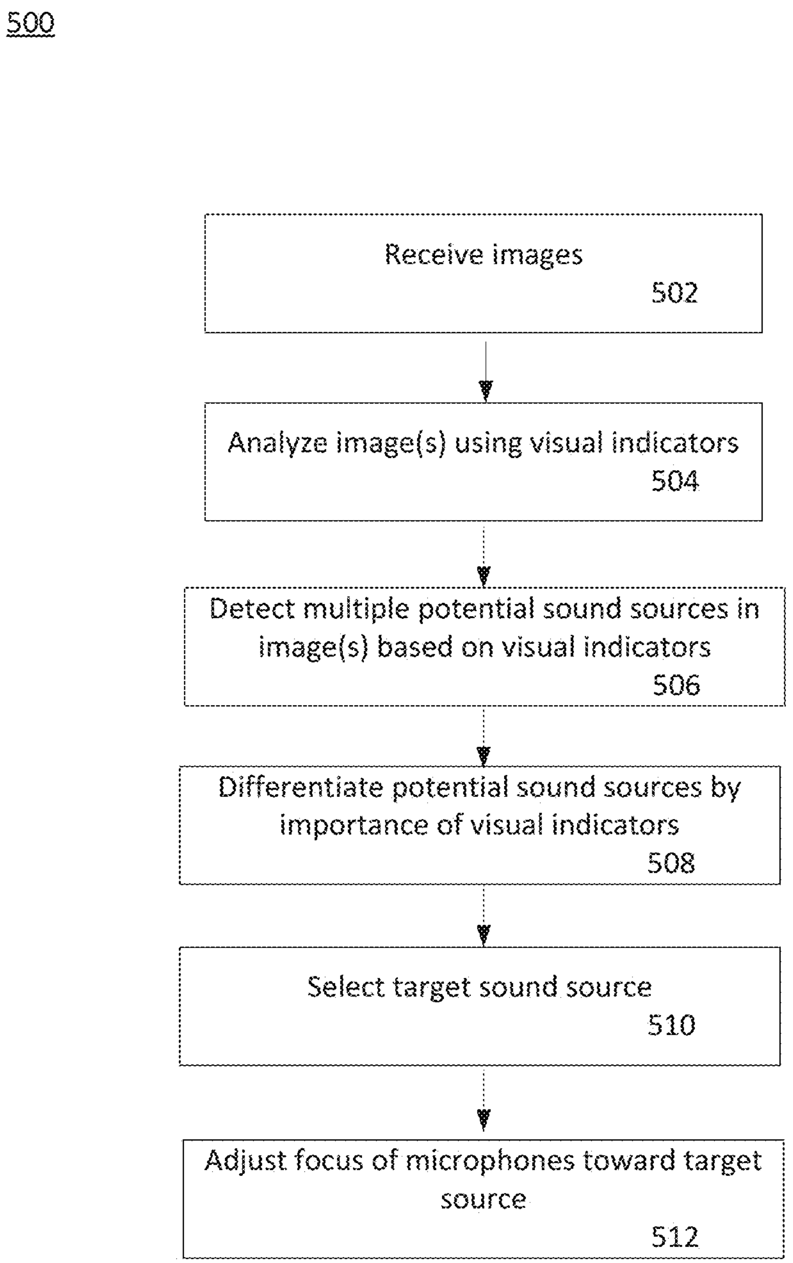
FIG. 5 is a flow diagram of various example method to focus a hearing aid onto a target sound among multiple environmental sounds, in accordance with some implementations.

FIG. 5 is a flow chart of methods to focus a hearing aid onto a target source among multiple environmental sounds. In block 502 images captured of the environment are received as described above for block 402 in FIG. 4. In block 504, the images are analyzed to determine objects that satisfy visual indicators, as described above for block 404 in FIG. 4.

In block 506, multiple potential sound sources including the target sound source are detected that individually satisfy at least one visual indicator of the one or more visual indicators.

The process may include applying the visual indicators in a manner to differentiate the multiple sound sources to identify the target source. Multiple potential sound sources may satisfy a number of visual indicators. In block 504, a target sound source is selected over the other potential sound sources based on the at least one visual indicator satisfied by the target sound. For example, the various visual indicators may be assigned weights such that the source that satisfies a greater weighted visual indicated may be identified. In some cases, more than one visual indicator may be satisfied by a several potential sound sources. In some implementations, each potential sound source may be given a score based on the visual indicators that are satisfied. For example, certain visual indicators that are satisfied may increase and/or decrease a score for a sound source. A potential sound source with a greatest score may be identified as the target source.

In some implementations, a tie breaker indicator may be applied to multiple potential sound sources that have a same score or otherwise satisfy equally weighted or the same visual indicators. For example, where several people are talking to the user at once, the tie breaker indicator may be the person who is the closest to the user.

In block 512, microphones of the hearing aid are adjusted to vertically and horizontally focus onto the target sound source, as described above for FIG. 4.

The methods of FIGS. 4 and 5 described herein can be performed via software, hardware, and combinations thereof. The process may be carried out in software, such as one or more steps of the process carried out by the hearing aid focusing system. For example, of some alternative combinations, a sound may be initially heard by the user and the user may desire to hear the sound more clearly by the user directing the hearing aid focusing system or by the focusing system recognizing the sound as important to locate the target source of the sound of interest. In such implementations, the focusing system may assess the initial sound to determine visual indicators that could pinpoint the direction of the sound source. Once the target source is identified, the process may proceed to focus the hearing aid to make the sound clearer for the user to hear. Although the description has been described with respect to particular implementations thereof, these particular implementations are merely illustrative, and not restrictive.

Figure 6:
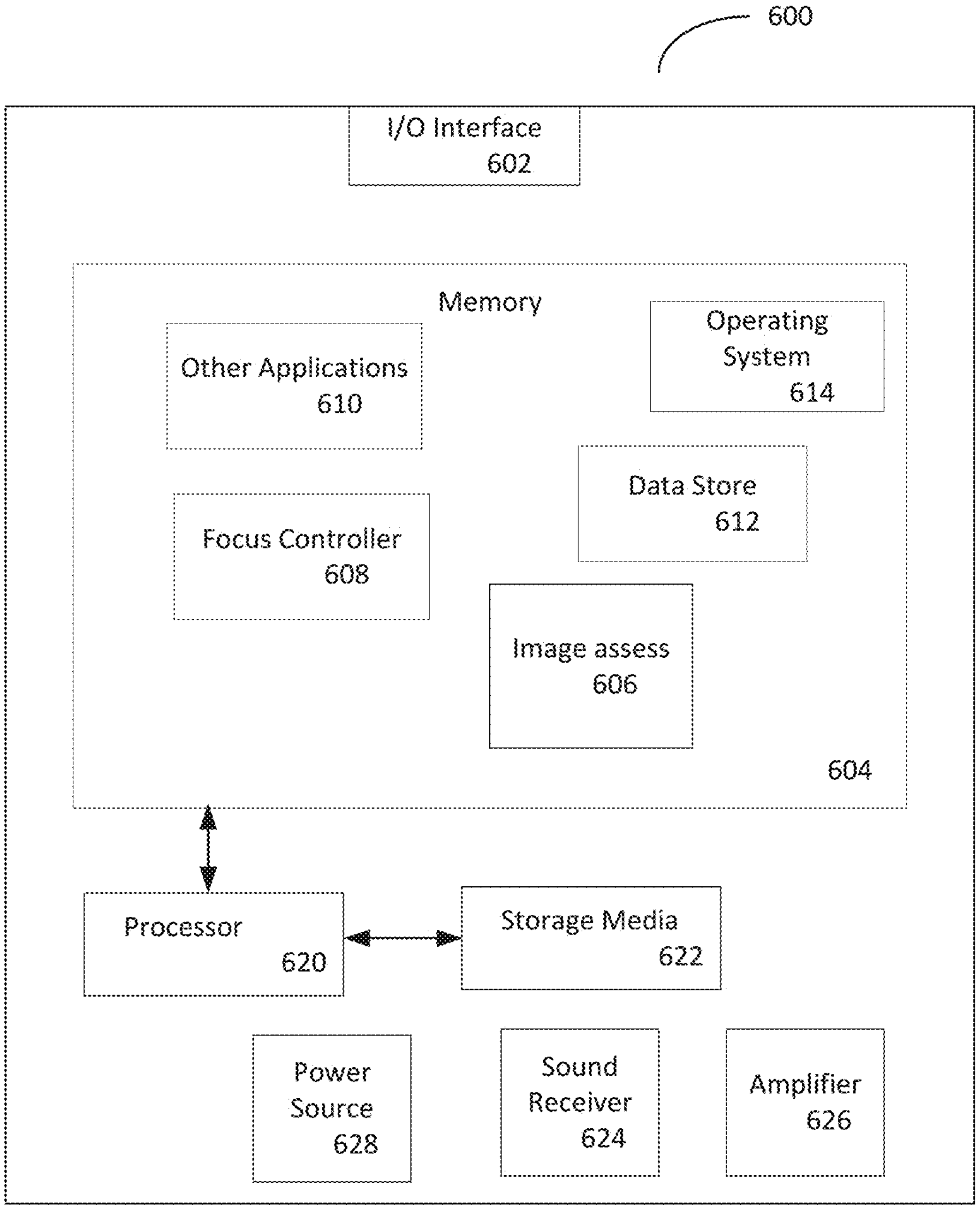
FIG. 6 is a block diagram of components of the hearing aid focusing system usable to implement in the processes of FIGS. 4-5, in accordance with some implementations.

FIG. 6 is a block diagram illustrating an example functional electrical components of a hearing aid device (in base 206 in FIG. 2) (also referred to as an apparatus) upon which aspects of the focusing system described herein may be implemented. The hearing aid device 600 is merely illustrative and not intended to limit the scope of the claims. One of ordinary skill in the art would recognize other variations, modifications, and alternatives.

In one exemplary implementation, hearing aid device 600 includes an I/O interface 602 (which may represent a combination of a variety of communication interfaces). In some implementations, interface 602 may communicate with the image capture device (such as item 204 in FIG. 2) to receive image information. The connection with the image capture device may be wired, such as electrical cables, or wireless as described below. The interface 602 may also receive input from the user, such as user commands to operate aspects of the focusing system, e.g., turn on the image capture device to initiate the focusing process as described in FIGS. 4 and 5.

The interface 602 may also be enabled for wireless communication, such as via BLUETOOD, BLUETOOTH Low Energy (BLE), radio frequency identification (RFID), etc. Wireless communication may be enabled to communicate with another hearing aid of a pair of hearing aids while being worn at the other ear of the user. Image information identified target sound sources, and other information may be shared with the other hearing aid of the pair through interface 602. Wireless communication by the hearing aid may also connect with other computing devices, such as a smart device of the user, e.g., smartphone, smart watch, etc. In this manner, image information from an image capture device be transferred between hearing aids and may assist in controlling the focus of a pair of hearing aid devices.

In some implementations, hearing aid device 600 may also include software that enables communications of I/O interface 602 over a network such as HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like. The communication network may include a local area network, a wide area network, a wireless network, an Intranet, the Internet, a private network, a public network, a switched network, or any other suitable communication network, such as for example Cloud networks.

Other common hearing aid device components may be included, such as a receiver 624 of a microphone to receive sound input, computer chip-embedded amplifier 626 to convert electrical signals from the microphones to digital signals. Power source 628 often include disposable and/or rechargeable batteries.

Hearing aid device 600 typically includes additional familiar computer components such as a processor 620, and memory storage devices, such as a memory 604. A bus (not shown) may interconnect hearing aid components. While a computer is shown, it will be readily apparent to one of ordinary skill in the art that many other hardware and software configurations are suitable for use with the present invention Memory 604 may include solid state memory in the form of NAND flash memory and storage media 622. The computer device may include a microSD card for storage and/or may also interface with cloud storage server(s). Memory 604 and storage media 622 are examples of tangible non-transitory computer readable media for storage of data, audio files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, cloud storage, and the like. A data store 612 may be employed to store various on-board data.

Hearing aid device 600 may include one or more computer programs, such as one or more software modules for image assessment 606 and focus controller 608 and various other applications 610 to perform operations described herein. The image assessment module 606 performs one or more operations of recognizing objects in the images, determining whether recognized objects satisfy one or more visual indicators, identifying one or more objects as target sound sources, and/or determine a vertical and horizontal direction of the target sound source, such as grid location, e.g., quadrant information, to locate the target sounds source in the environment. The focus controller 608 may control operations of the microphone and processing of sound received by the microphone according to the direction of the target sound source. Controls may include adjusting filtering and/or amplification, such as via amplifier 626 of particular sounds to isolate the sound. Other methods of adjusting the focus of the hearing aid, such as redirecting the direction of the microphones are possible.

Such computer programs, when executed by one or more processors, are operable to perform various tasks of methods including determine attention features in an environment and identifying attention requiring noises, as described above. The computer programs may also be referred to as programs, software, software applications or code, may also contain instructions that, when executed, perform one or more methods, such as those described herein. The computer program may be tangibly embodied in an information carrier such as computer or machine readable medium, for example, the memory 604, storage device or memory on processor 620. A machine readable medium is any computer program product, apparatus or device used to provide machine instructions or data to a programmable processor.

Hearing aid device 600 further includes an operating system 614 to control and manage the hardware and software of the computer device 600. Any operating system 614, e.g., mobile OS, that is supports the noise cancelation override methods may be employed, e.g., IOS, Android, Windows, MacOS, Chrome, Linux, etc.

Although the description of the override system has been described with respect to particular embodiments thereof, these particular embodiments are merely illustrative, and not restrictive.

Any suitable programming language can be used to implement the routines of particular embodiments including IOS, Objective C, Swift, Java, Cotlin, C, C++, C#, JavaScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a" "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for adjusting a hearing aid of a user, the method comprising:

providing a hearing aid that includes at least a first microphone in a position that is vertically offset and horizontal offset from a second microphone of the hearing aid;

receiving one or more images of an environment of the user, captured by one or more image capture devices commutatively coupled to the hearing aid;

analyzing the one or more images to determine one or more visual indicators of the environment from the at least one of the one or more images and to identify the environment;

accessing stored sound source information including a known sound source location corresponding to the identified environment;

determining an overlay of a grid on at least one of the one or more images including multiple grid cells;

identifying the at least one target sound source in the environment and the known sound source location based, at least in part, on the stored sound source information;

determining grid location information for the at least one target sound source based, at least in part, on a position of the at least one target sound source in one or more of the multiple grid cells of the at least one of the one or more images; and using the grid location information, adjusting focus of sound received by at least one of the first microphone and the second microphone in at least one of a vertical direction and a horizontal direction toward the at least one target sound source.

2. The method of claim 1, wherein the at least one target sound sources includes a group of multiple target sound sources that individually satisfy at least one visual indicator of the at least one target sound source and wherein adjusting the focus of the sound received is toward the group.

3. The method of claim 1, wherein analyzing the one or more images includes:

determining that the at least one target sound source and at least one other potential sound source satisfies a same one or more visual indicator of the at least one target sound source; and in response to the satisfying, applying a tie breaker visual indicator to identify the at least one target sound source.

4. The method of claim 1, further comprising:

locking onto the at least one target sound source;

determining that the at least one target sound source is in a changed location relative to the hearing aid positioned on the user; and re-adjusting the focus of sound received by at least one of the first microphone and the second microphone in at least one of the vertical direction and the horizontal direction toward the changed location of the at least one target sound source.

5. The method of claim 1, wherein the one or more visual indicators includes information regarding a distance of the at least one target sound source from the user and analyzing the one or more images includes estimating the distance of the target sound source to be within a threshold distance from the user.

6. The method of claim 1, wherein the one or more visual indicators includes identifying characteristics of a person of importance and analyzing the one or more images includes identifying the person of importance as the at least one target sound source.

7. An apparatus of a hearing aid focusing system, the apparatus comprising:

a hearing aid of a user comprising:

at least a first microphone in a position that is vertically offset and horizontal offset from a second microphone of the hearing aid;

one or more processors; and logic encoded in one or more non-transitory media for execution by the one or more processors and when executed operable to perform operations comprising:

receiving one or more images of an environment of the user, captured by one or more image capture devices commutatively coupled to the hearing aid;

analyzing the one or more images to determine one or more visual indicators of the environment from the at least one of the one or more images and to identify the environment;

accessing stored sound source information including a known sound source location corresponding to the identified environment;

determining an overlay of a grid on at least one of the one or more images including multiple grid cells;

identifying the at least one target sound source in the environment and the known sound source location based, at least in part, on the stored sound source information;

determining grid location information for the at least one target sound source based, at least in part, on a position of the at least one target sound source in one or more of the multiple grid cells of the at least one of the one or more images; and using the grid location information, adjusting focus of sound received by at least one of the first microphone and the second microphone in at least one of a vertical direction and a horizontal direction toward the target sound source.

8. The apparatus of claim 7, further comprising the one or more image capture devices in a fixed position relative to the hearing aid.

9. The apparatus of claim 7, wherein the at least one target sound sources includes a group of multiple target sound sources that individually satisfy at least one visual indicator at least one target sound source and wherein adjusting the focus of the sound received is toward the group.

10. The apparatus of claim 7, wherein the operations further comprise:

locking onto the target sound source;

determining that the target sound source is in a changed location relative to the hearing aid positioned on the user; and re-adjusting the focus of sound received by at least one of the first microphone and the second microphone in at least one of the vertical direction and the horizontal direction toward the changed location of the target sound source.

11. The apparatus of claim 7, wherein the one or more visual indicators includes identifying characteristics of a person of importance and analyzing the one or more images includes identifying the person of importance as the target sound source.

12. A non-transitory computer-readable storage medium carrying program instructions thereon for adjusting a hearing aid worn by a user, the instructions when executed by one or more processors cause the one or more processors to perform operations comprising:

receiving, by a first microphone of the hearing aid in a position that is vertically offset and horizontal offset from a second microphone of a hearing aid, sound signals from at least one target sound source in an environment of a user;

receiving one or more images of an environment of the user, captured by one or more image capture devices commutatively coupled to the hearing aid;

analyzing the one or more images to determine one or more visual indicators of the environment from the at least one of the one or more images and to identify the environment;

accessing stored sound source information including a known sound source location corresponding to the identified environment;

determining an overlay of a grid on at least one of the one or more images including multiple grid cells;

identifying the at least one target sound source in the environment and the known sound source location based, at least in part, on the stored sound source information; and using the grid location information, adjusting focus of sound received by at least one of the first microphone and the second microphone in at least one of a vertical direction and a horizontal direction toward the at least one target sound source.

13. The non-transitory computer-readable storage medium of claim 12, wherein the at least one target sound sources includes a group of multiple target sound sources that individually satisfy at least one visual indicator of the at least one target sound source and wherein adjusting the focus of the sound received is toward the group.

14. The non-transitory computer-readable storage medium of claim 12, wherein the operations further comprise:

locking onto the at least one target sound source;

determining that the at least one target sound source is in a changed location relative to the hearing aid positioned on the user; and re-adjusting the focus of sound received by at least one of the first microphone and the second microphone in at least one of the vertical direction and the horizontal direction toward the changed location of the at least one target sound source.

15. The non-transitory computer-readable storage medium of claim 14, wherein the one or more visual indicators includes identifying characteristics of a person of importance and analyzing the one or more images includes identifying the person of importance as the at least one target sound source.

16. The method of claim 1, wherein the at least one target sound sources is undetectable in the one or more images.

17. The method of claim 1, wherein the at least one target sound source includes a group of multiple target sound sources that individually satisfy one or more visual indicators according to a different respective score, and wherein identifying the at least one target sound source is further based on the respective score.

* * * * *